United States Patent
Taylor et al.

[11] Patent Number: 5,945,078
[45] Date of Patent: Aug. 31, 1999

[54] PROCESSES FOR THE SCRUBBING OF NOXIOUS SUBSTANCES

[75] Inventors: Mark Philip Taylor, Bristol; Peter Leslie Timms, Bristol, both of United Kingdom

[73] Assignee: The BOC Group plc, Windlesham, United Kingdom

[21] Appl. No.: 08/892,040

[22] Filed: Jul. 14, 1997

[30] Foreign Application Priority Data

Jul. 15, 1996 [GB] United Kingdom ............... 96 14848

[51] Int. Cl.[6] .......................... B01D 53/46; B01D 53/68
[52] U.S. Cl. ............................ 423/210; 423/245.2
[58] Field of Search .................. 423/210, 245.2

[56] References Cited

U.S. PATENT DOCUMENTS

| | | | |
|---|---|---|---|
| 2,313,022 | 3/1943 | Rottmayr | 423/210 |
| 4,550,010 | 10/1985 | Chelu | 423/224 |
| 5,182,088 | 1/1993 | Leondaridis et al. | 423/210 |
| 5,527,517 | 6/1996 | Bridges et al. | 423/210 |

FOREIGN PATENT DOCUMENTS

| | | | |
|---|---|---|---|
| 610887 | 12/1960 | Canada | 423/210 |
| 0 750 935 | 3/1996 | European Pat. Off. | |
| 63-162025 | 7/1988 | Japan | 423/210 |
| 3-137916 | 6/1991 | Japan | 423/210 |
| 2 295 611 | 11/1995 | United Kingdom . | |

Primary Examiner—Ngoc-Yen Nguyen
Attorney, Agent, or Firm—Salvatore P. Pace

[57] ABSTRACT

A process for the scrubbing of species of an element of Group 3, 4 and 5(b) of the Periodic Table from a gas stream. The process comprises contacting the gas stream with an aqueous solution of hydrofluoric acid (HF) or a solution containing the hydrogen fluoride ion $HF_2^-$ and an oxidizing agent.

13 Claims, 1 Drawing Sheet

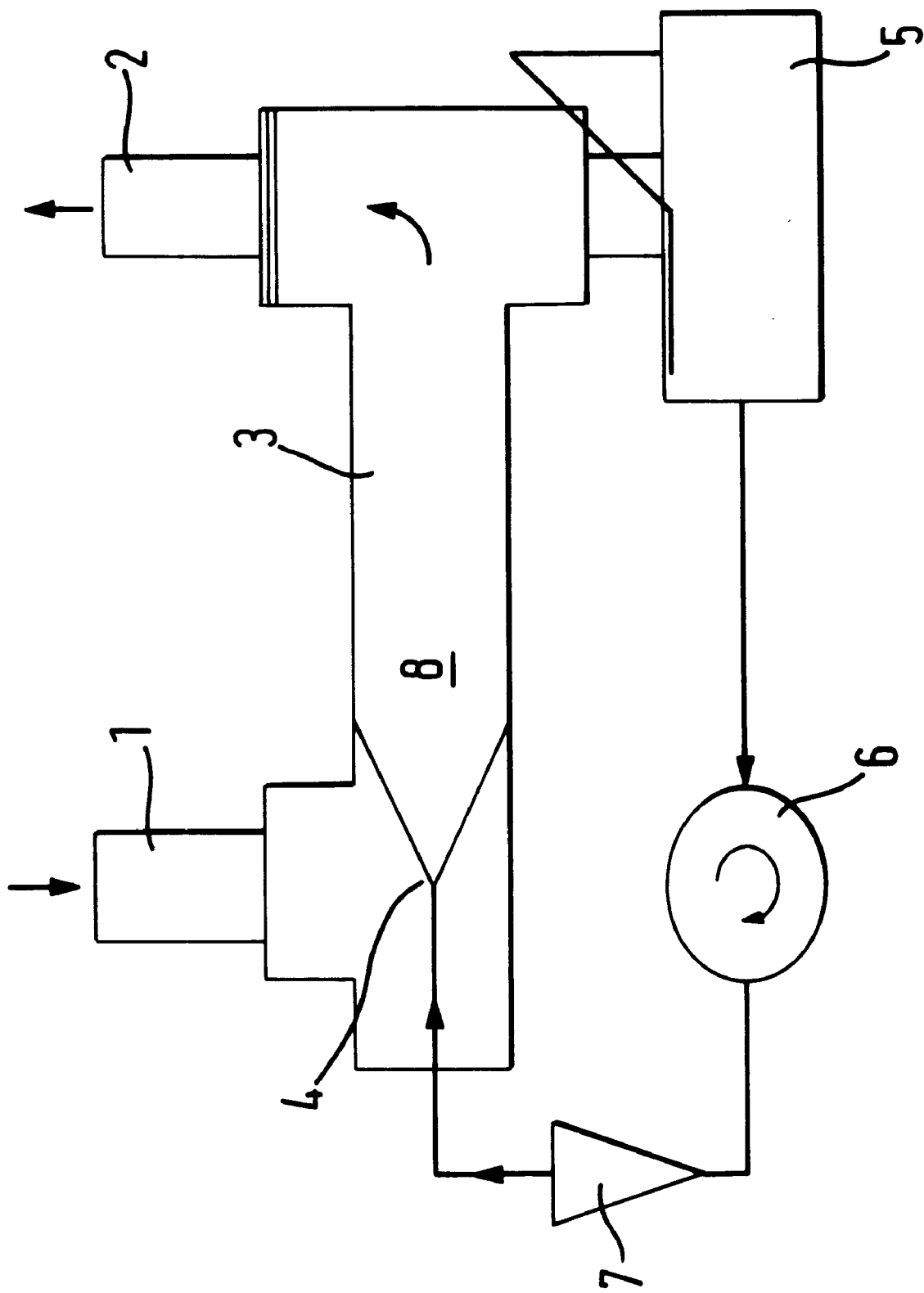

PROCESSES FOR THE SCRUBBING OF NOXIOUS SUBSTANCES

BACKGROUND OF THE INVENTION

This invention relates to processes for the scrubbing of noxious substances from exhaust gas stream, particularly those found in the semiconductor industry.

Large quantities of noxious substances are employed in the semiconductor industry in the processing of electronic wafers/chips and other devices. These include a variety of compounds of Group 3, 4 and 5(b) elements of the Periodic Table and in particular hydrides of such elements, for example silane ($SiH_4$), phosphine ($PH_3$), arsine ($AsH_3$), geranium hydride ($GeH_4$) and boron hydride ($B_2H_6$). Such hydride gases are commonly pyrophoric and toxic; their uncontrolled release from semiconductor processing chambers in exhaust gas streams would lead to a number of problems including blocking the chamber ducts, fire hazards, corrosion of the processing apparatus and a visible plume from the exhaust stack of the apparatus.

Traditional dosed water scrubbing methods have generally been found to be problematic in that the by-products are generally solid and precipitate to cause blocking of the apparatus. In cases in which the wet scrubber is dosed with an oxidiser or a base, the scrubbing method generally suffers from a poor rate of reaction between the solution and, for example, the insoluble silane and this condition is exacerbated by a lack of solubility of the reaction by-products.

There is therefore a need for an improved scrubbing process for such noxious substances.

SUMMARY OF THE INVENTION

In accordance with the invention, there is provided a process for the scrubbing of species of an element of Group 3, 4 and 5(b) of the Periodic Table from a gas stream which comprises contacting the gas stream with an aqueous solution of hydrofluoric acid (HF) or a solution containing the hydrogen fluoride ion $HF_2^-$ and an oxidising agent.

Typical elements used in the semiconductor industry are boron, aluminium, silicon, phosphorus, gallium, germanium and arsenic. Hydrides of such elements are the most commonly used and are most applicable to the present invention.

The exhaust gas stream from process chambers employing such species may include unused volatile species, for example hydrides themselves, and may also include fumes which may derive from the complete or partial oxidation of the species or of the elements per se, for example $SiO_x$ fumes.

The exhaust gas stream may also include gases/vapours resulting from the use of organometallic sources of the elements used for easier or safer introduction of the elements in to the process chamber, for example

- tetramethylorthosilicate (TEOS) for the introduction of silicon
- trimethylphosphite (TMP) for the introduction of phosphorus
- trimethylborate (TMB) for the introduction of boron
- trimethylaluminium (TMA) for the introduction of aluminium.

The process of the invention can in general scrub all such species from an exhaust gas stream.

The $HF_2^-$ ion can be present in the form of a solution of an acid fluoride, most usefully one or more of ammonium hydrogen fluoride, potassium hydrogen fluoride or sodium hydrogen fluoride.

Whether an aqueous solution of HF itself is employed or whether the $HF_2^-$ ion is present, it is preferred that the concentration is from 0.05 to 5 molar, preferably from 1 to 2 molar (2% to 4% by weight).

The HF can be a waste acid stream from the wet benches of the semiconductor facility. The acid fluoride solution may be derived by combining waste base, for example aqueous ammonia solution with waste HF solutions in a mole ratio of, for example, $1 \times NH_3$ to $2 \times HF$. The acid fluoride solutions in particular have the advantage of reducing the amount of gaseous HF carried away by the scrubbed gas stream.

Suitable oxidising agents include oxygen, hydrogen peroxide ($H_2O_2$), ozone, ferric ions ($Fe^{3+}$), manganese ions $Mn^{2+}$, nitric acid ($HNO_3$) or chlorine. Ozone and hydrogen peroxide are preferred.

Advantageously, a reaction promoter is added to the solution. Preferably the reaction promoter is one or more of the ions of the transition metals manganese ($Mn^{2+}$), iron ($Fe^{2+}$, $Fe^{3+}$), cobalt ($Co^{2+}$), nickel ($Ni^{2+}$) and copper ($Cu^{2+}$) present in solution.

It is most preferred that the reaction promoter comprises an addition to the solution of copper sulphate as a source of cuprous ions.

Overall, the reaction promoter, especially the cuprous ions, should preferably be added in excess of 0.0001 molar, most preferably in an amount of 0.005 to 0.01 molar.

In the operation of the process of the invention, it is preferred that a scrubbing liquor comprising HF in aqueous solution or the $HF_2^-$ ions in aqueous solution is passed concurrently with a solution containing an oxidising agent from a holding tank and through a suitable pump to a spray nozzle where the solution is sprayed in to a flow of the exhaust gas stream.

BRIEF DESCRIPTION OF THE DRAWINGS

For a better understanding of the invention, reference will now be made, by way of exemplification only, to the accompanying drawings which shows a schematic representation of apparatus used in a process of the invention.

DETAILED DESCRIPTION

With reference to the drawing, there is shown an apparatus for carrying out a process of the invention. It comprises a gas inlet 1 and a gas outlet 2 and a spray chamber 3 therebetween. A spray nozzle 4 is located at 4 substantially vertically beneath the centre of the inlet 1.

The apparatus also includes a sump 5 and pipe means linking the sump 5 to the spray nozzle via a hydrogen fluoride/oxidising agent introduction zone 6 and a pump 7.

In operation of the apparatus, water (initially) is drawn from the sump 5 by means of the pump 7 through the introduction zone 6 in which waste hydrogen fluoride and waste hydrogen peroxide (both obtained as waste from separate semiconductor processing plants) are mixed with the water to form an aqueous solution containing approximately 1.5 molar of fluoride and 1 molar hydrogen peroxide. In addition, copper sulphate was optionally added to the solution to provide approximately 0.005 molar concentration of copper ($Cu^{2+}$) ions as a reaction promoter.

The aqueous solution is thence urged by the pump 7 through the spray nozzle to form a relatively fine spray 8 of the solution beneath the inlet of an exhaust gas containing silane ($SiH_4$) in to the spray chamber 3.

The intimate mixing of the exhaust gas and the aqueous solution spray in the spray 8 resulting in the chemical reactions described below, all of which can be piped away for further processing by standard chemical techniques or which can be recycled for further inter-action with the exhaust stream.

Typical reactions using hydrogen peroxide as the oxidising agent are shown in equation (1):

$$SiH_4 + 4H_2O_2 + 6HF \rightarrow H_2SiF_6 + 8H_2O \quad -(1)$$

Typical reactions using oxygen and ozone as oxidising agents are shown in equations (2) and (3) respectively:

$$SiH_4 + 2O_2 + 6HF \rightarrow H_2SiF_6 + 4H_2O \quad -(2)$$

$$3SiH_4 + 4O_3 18HF_2^- \rightarrow 3SiF_6^{2-} + 18F^- + 6H^+ + 12H_2O \quad -(3)$$

All the above reaction products are generally soluble in water, thereby allowing ready removal of the products from the system in contrast to prior art methods in which particulate reaction products tended to form and were often present in large quantities.

A further benefit of using a solution of hydrofluoric acid (HF) or a solution containing the hydrogen fluoride $HF_2^-$ ion is that all the oxidation products of the volatile species being scrubbed, in particular silane, tend to react with HF or the $HF_2^-$ ion as shown in equations (4) and (5) below in the case of silane and are thereby rendered soluble:

$$SiO_2 + 6HF \rightarrow H_2SiF_6 + 2H_2O \quad -(4)$$

$$SiO_2 + 6HF_2^- \rightarrow SiF_6^{2-} + 2H^+ + 2H_2O \quad -(5)$$

This frees the surface of the aqueous solution for further interaction with the gaseous phase and prevents the formation of dust plumes and solid blockages, thereby leading to enhanced reliability of the system.

We claim:

1. A process for the scrubbing of species of an element of Group 3, 4 and 5(b) of the Periodic Table from a gas stream comprising:
   contacting 2 gas stream with a solution containing the hydrogen fluoride ion $HF_2^-$ and an oxidising agent.

2. The process according to claim 1 in which the element is at least one of boron, aluminum, silicon, phosphorus, gallium, germanium and arsenic.

3. The process according to claim 1 in which the species are hydrides of the elements.

4. The process according to claim 1 in which the $HF_2^-$ ion is present in the form of a solution of an acid fluoride.

5. The process according to claim 4 in which the acid fluoride is one or more of ammonium hydrogen fluoride, potassium hydrogen fluoride or sodium hydrogen fluoride.

6. The process according to claim 5 in which the hydrogen fluoride ion concentration is from 0.05 to 5 molar.

7. The process according to claim 6 in which the hydrogen fluoride ion concentration is from 1 to 2 molar.

8. The process according to claim 1 in which the oxidising agent comprises hydrogen peroxide.

9. The process according to claim 1 in which the oxidising agent comprises ozone.

10. The process according to claim 1 in which the oxidising agent comprises ferric ($Fe^{3+}$) ion in solution.

11. The process according to claim 1 in which a reaction promoter is present in the solution.

12. The process according to claim 11 in which at least one of the ions of the transition metals consisting of manganese ($Mn^{2+}$), iron ($Fe^{2+}$, $Fe^{3+}$), cobalt ($Co^{2+}$), nickel ($Ni^{2+}$) and copper ($Cu^{2+}$) are present in solution as one reaction promoter.

13. The process according to claim 12 in which copper sulphate is added to the solution as a source of copper ions.

* * * * *